(12) United States Patent
Hane et al.

(10) Patent No.: US 7,135,844 B2
(45) Date of Patent: Nov. 14, 2006

(54) CONTROL CIRCUIT FOR DC/DC CONVERTER

(75) Inventors: Norimasa Hane, Chuo-ku (JP); Satoru Ohkawa, Chuo-ku (JP); Takeshi Naka, Chuo-ku (JP)

(73) Assignees: Torex Device Co., Ltd., Tokyo (JP); Device Engineering Co., Ltd., Tokyo (JP)

(*) Notice: Subject to any disclaimer, the term of this patent is extended or adjusted under 35 U.S.C. 154(b) by 267 days.

(21) Appl. No.: 10/832,468

(22) Filed: Apr. 27, 2004

(65) Prior Publication Data

US 2004/0263136 A1   Dec. 30, 2004

(30) Foreign Application Priority Data

Apr. 28, 2003  (JP) .............................. 2003-124217

(51) Int. Cl.
G05F 1/56  (2006.01)
(52) U.S. Cl. ...................... 323/283; 323/271; 323/285
(58) Field of Classification Search ................ 323/271, 323/282, 283, 284, 285
See application file for complete search history.

(56) References Cited

U.S. PATENT DOCUMENTS

| | | | | |
|---|---|---|---|---|
| 4,540,933 A | * | 9/1985 | Teuling | 323/271 |
| 6,600,298 B1 | * | 7/2003 | McDonald et al. | 323/271 |
| 6,614,208 B1 | * | 9/2003 | Narita | 323/283 |
| 6,661,208 B1 | * | 12/2003 | Rutter et al. | 323/224 |
| 6,737,842 B1 | * | 5/2004 | Bai et al. | 323/282 |
| 6,836,103 B1 | * | 12/2004 | Brooks et al. | 323/282 |
| 6,933,711 B1 | * | 8/2005 | Sutardja et al. | 323/283 |
| 6,954,055 B1 | * | 10/2005 | Umemoto et al. | 323/284 |
| 6,958,592 B1 | * | 10/2005 | Chapuis | 323/246 |

FOREIGN PATENT DOCUMENTS

| | | |
|---|---|---|
| JP | 4-101286 U | 9/1992 |
| JP | 6-303766 A | 10/1994 |
| JP | 10-215567 A | 8/1998 |
| JP | 11-89222 A | 3/1999 |
| JP | 11-187649 A | 7/1999 |

* cited by examiner

Primary Examiner—Jeffrey Sterrett
(74) Attorney, Agent, or Firm—Sughrue Mion, PLLC

(57) ABSTRACT

A control circuit for a DC/DC converter which includes a main switching element, a sub switching element, and a reactor in order to convert a DC input voltage to a DC output voltage. The control circuit comprises a clock signal generator for generating a clock signal during a blank period in which both the main and sub switching elements are off; a comparator for comparing a reference voltage and a voltage at a connection point between the main and sub switching elements and for outputting a comparison signal indicating a relation of magnitude between the reference voltage and the voltage at the connection point; and an operation mode switching section for monitoring the comparison signal at a timing corresponding to the clock signal in order to detect a voltage state at the connection point, and controlling the sub switching element in accordance with the voltage state.

6 Claims, 10 Drawing Sheets

CONTROL CIRCUIT FOR DC/DC CONVERTER

BACKGROUND OF THE INVENTION

1. Field of the Invention

The present invention relates to a control circuit for a DC/DC converter, and more particularly to a control circuit for a DC/DC converter in which main switching means and sub switching means are alternately turned on and off so as to obtain a predetermined DC output voltage.

2. Description of the Related Art

DC/DC converters are widely used in applications in which output voltage of a DC power source is stepped down or up so as to obtain a predetermined DC output voltage; e.g., a power supply circuit for a cellular phone. In such a DC/DC converter, a switching element is turned on and off, and the on/off operation of the switching element is controlled in order to convert a DC input voltage to a predetermined DC output voltage. In general, a MOSFET is used as a switching element.

Among DC/DC converters of such a type, a step-down DC/DC converter has a reactor on the output side. Therefore, in periods during which the switching element is off, a closed circuit must be formed in order to discharge electrical energy accumulated in the reactor stemming from load current. Therefore, in the past, such a closed circuit has been realized by use of a recirculation diode.

However, when a recirculation diode is used, because of its relatively large forward voltage drop, the recirculation diode consumes a large amount of electrical power, thereby lowering the efficiency of the DC/DC converter. Such a large electrical power consumption becomes a serious problem when the DC/DC converter is realized in the form of an IC chip in order to reduce the size of the DC/DC converter.

In view of the above, there has been proposed a DC/DC converter in which a MOSFET, which serves as a switching element, is used in place of the above-described recirculation diode; a parasitic diode of the MOSFET is caused to function as a recirculation diode, and the switching function of the MOSFET is utilized so as to reduce the above-mentioned forward voltage drop. Notably, the on resistance of a MOSFET is much smaller than the forward-direction resistance of the recirculation diode, and the loss decreases accordingly.

Incidentally, in a DC/DC converter whose recirculation diode is replaced with a switching element, two switching elements generally formed of MOSFETs are mutually connected in series. Specifically, a first switching element (hereinafter referred to as a "main switching element") for controlling the duty of on periods so as to regulate the output voltage to a desired value is connected in series with a second switching element (hereinafter referred to as a "sub switching element") for discharging accumulated electrical energy from the above-mentioned reactor in periods during which the main switching element is off, and a DC output voltage is extracted from the connection point between the two switching elements via a reactor.

Therefore, in such a DC/DC converter, the main switching element and the sub switching element must be controlled in such a manner that these elements do not enter an on state simultaneously. In view of this, the on-off modes of the main switching element and the sub switching element are alternately switched, while a mode (blank period) in which the two switching elements are off is interposed between the on-off modes.

However, in such a DC/DC converter, when the sub switching element is turned off in a mode in which the main switching element is off and the sub switching element is on, there may occur a harmful reverse flow phenomenon in which current stemming from the electrical energy accumulated in the reactor flows to a DC power source via the parasitic diode of the main switching element. In order to avoid such a harmful reverse flow phenomenon, in a conventional DC/DC converter of the above-mentioned type, load current flowing through the sub switching element is monitored, and the sub switching element is turned off upon detection of a time point at which the load current becomes zero. This is because the reverse flow of load current occurs after the load current becomes zero.

Therefore, in a conventional DC/DC converter which includes a main switching element and a sub switching element that are alternately turned on and off so as to obtain a predetermined DC output voltage, a current detection circuit is provided in order to detect the above-mentioned load current (in particular, its flow direction). Such a current detection circuit includes a resistor which is connected in series to, for example, the sub switching element, and monitors the voltage produced across the resistor through comparison by use of a comparator. That is, the current detection circuit can detect, from the voltage produced across the resistor becoming zero, that the load current to be detected becomes zero.

Notably, Japanese Utility Model Application Laid-Open (kokai) No. 04-101286 discloses a DC/DC converter in which a main switching element and a sub switching element are alternately turned on and off so as to obtain a predetermined DC output voltage.

Incidentally, the above-described current detection circuit must detect, with high accuracy, a point in time at which the load current becomes zero. Therefore, in the case where the current detection circuit contains a comparator as described above, the comparator must be of high accuracy and is therefore expensive. Further, in the case where the current detection circuit is configured to provide high accuracy, current necessary to drive the current detection circuit increases, thereby hindering reduction in size of the DC/DC converter. Further, in the case where a resistor is connected in series to the switching element in order to form a current detection circuit, power loss is generated at the resistor, thereby hindering improvement in efficiency. These drawbacks become fatal in the case where such a DC/DC converter is fabricated in the form of an IC chip.

SUMMARY OF THE INVENTION

In view of the drawbacks involved in the conventional techniques, an object of the present invention is to provide a control circuit for a DC/DC converter which is suitable for a DC/DC converter in which main switching means and sub switching means are alternately turned on and off so as to obtain a desired DC output voltage, and which contributes to fabrication in the form of an IC chip, reduction in size, and reduction in cost.

Another object of the present invention is to provide a control circuit for a DC/DC converter which can detect that a load has entered a light load state through mere monitoring of voltage in a certain period, without use of a circuit for monitoring the magnitude or polarity of load current, to thereby improve electrical power efficiency during light load periods.

In order to achieve the above-described objects, the present invention provides a control circuit for a DC/DC converter comprising main switching means, sub switching means, and a reactor and adapted to convert a DC input voltage to a predetermined DC output voltage. The control circuit comprises clock signal generation means for generating a clock signal during a blank period in which both the main switching means and the sub switching means are off a comparator for comparing a predetermined reference voltage and a voltage at a connection point at which the main switching means and the sub switching means are connected together, and for outputting a comparison signal indicating a relation of magnitude between the reference voltage and the voltage at the connection point; and operation mode switching means for monitoring the state of the comparison signal at a timing determined on the basis of the clock signal in order to detect a voltage state at the connection point, and controlling the sub switching means in accordance with the voltage state.

Preferably, the operation mode switching means controls the sub switching means at a time point delayed from the clock signal.

Preferably, the clock signal is an output signal of an intermediate one of a plurality of logical elements connected in cascade to form latch means for generating the blank period.

Preferably, the reference voltage is higher than the ground potential but lower than the DC output voltage of the DC/DC converter; when the voltage at the connection point during the blank period which is latched in response to the clock signal is not higher than the reference voltage, control is determined to be performed in a regular mode, whereby the main switching means and the sub switching means are alternately turned on and off; and when the voltage at the connection point during the blank period is higher than the reference voltage, the control is determined to be performed in a non-regular mode, whereby only the main switching means is turned on and off at a predetermined duty, with the sub switching means being maintained off.

Alternatively, the reference voltage is higher than the DC input voltage of the DC/DC converter but lower than the DC output voltage of the DC/DC converter; when the voltage at the connection point during the blank period which is latched in response to the clock signal is not lower than the reference voltage, control is determined to be performed in a regular mode, whereby the main switching means and the sub switching means are alternately turned on and off; and when the voltage at the connection point during the blank period is lower than the reference voltage, the control is determined to be performed in a non-regular mode, whereby only the main switching means is turned on and off at a predetermined duty, with the sub switching means being maintained off.

Preferably, the control circuit further comprises a logic processing circuit, which operates when the comparison signal varies stemming from a variation in the voltage at the connection point caused by resonance of the voltage, for latching a first state change of the comparison signal and for maintaining the state during the period of a predetermined cycle.

In the present invention, a comparison signal is produced on the basis of the voltage at the connection point between the main switching means and the sub switching means in a blank period which is immediately before the main switching means is turned on and in which both the switching means are off; and the voltage state of the connection point is detected through monitoring of the comparison signal so as to control the sub switching means. Therefore, the sub switching means is not required to be controlled in real time at a timing determined on the basis of the clock signal, and the comparator for outputting the comparison signal is not required to be of a high accuracy type. Accordingly, the comparator can be formed of an element which is inexpensive and consumes a smaller amount of electrical power.

Accordingly, the control circuit can be provided inexpensively, and by virtue of its reduced electrical power consumption, the DC/DC converter can be operated at high efficiency even at the time of light load. In particular, the control circuit achieves the remarkable effect of achieving the technical target of reducing electrical power consumption, which is a key for fabricating the DC/DC converter in the form of an IC chip, to thereby realize fabrication of the DC/DC converter in the form of an IC chip.

Since the load entering a light load state can be detected through mere monitoring of the above-described voltage state, power conversion efficiency at the time of light load can be improved.

Since the clock signal is extracted from an intermediate stage of the latch means, the clock signal can be reliably generated within the blank period, whereby the above-described action and effects can be attained easily.

DESCRIPTION OF THE PREFERRED EMBODIMENTS

Embodiments of the present invention will be described in detail with reference to the drawings.

Figure 1:
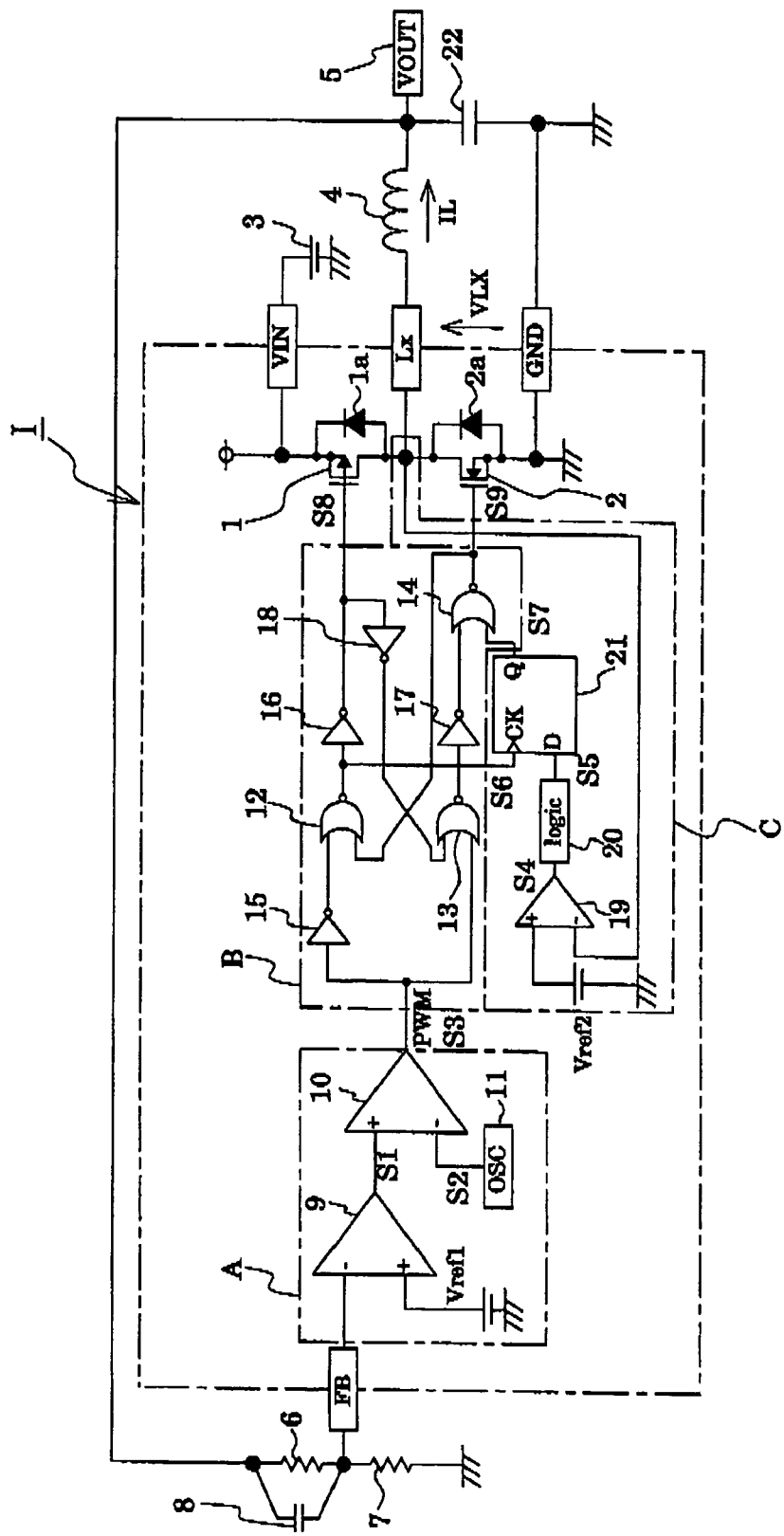
FIG. 1 is a circuit diagram showing a control circuit according to a first embodiment of the present invention, along with a DC/DC converter to which the control circuit is applied.

First Embodiment:

Before description of a control circuit according to the present embodiment, a main circuit of a DC/DC converter to which the control circuit is applied will be described. FIG. 1 is a circuit diagram showing a control circuit for a DC/DC converter according to a first embodiment of the present invention, along with the main circuit thereof.

The DC/DC converter according to the present embodiment is a step-down converter. In the DC/DC converter, a MOSFET 1, which serves as main switching means and to which a parasitic diode 1a is connected in parallel and in the reverse direction, and a reactor 4 are connected in series. Meanwhile, a MOSFET 2, which serves as sub switching means and to which a parasitic diode 2a functioning as a recirculation diode is connected in parallel, is connected to the point of connection between the MOSFET 1 and the reactor 4. A DC output voltage VOUT is extracted via the reactor 4 and an output terminal 5. A DC power source 3 is formed of a primary battery, and is connected in series to the MOSFET 1 and the reactor 4 in such a manner that the positive side is connected to the MOSFET 1.

In such a DC/DC converter, the MOSFETs 1 and 2 are controlled such that they are alternately turned on and off, and the ON time of the MOSFET 1 is controlled in order to step down the DC output voltage of the DC power source 3 (DC input voltage VIN of the DC/DC converter) to thereby output a predetermined DC output voltage VOUT from the output terminal 5. That is, the DC output voltage VOUT is defined by the ON time (duty) of the MOSFET 1. Further, electrical energy accumulated in the reactor 4 in periods during which the MOSFET 1 is on is discharged in periods during which the MOSFET 1 is off, by means of recirculation of current via the MOSFET 2 and the parasitic diode 2a thereof. In FIG. 1, reference numeral 22 denotes a capacitor for smoothing the DC output voltage VOUT.

The control circuit according to the present embodiment for turning on and off the MOSFETs 1 and 2 includes a PWM signal generating section A, a latch section B, and an operation mode switching section C, which are integrated in the form of an IC chip I. The IC chip I, the PWM signal generation section A, the latch section B, and the operation mode switching section C are sections surrounded by corresponding chain lines in FIG. 1.

In the PWM signal generation section A, the DC output voltage VOUT which is divided by use of resistors 6 and 7 and a capacitor 8 is applied to an error amplifier 9. A first reference voltage Vref1 is also applied to the error amplifier 9, whereby an error signal S1 is obtained. A comparator r 10 compares the error signal S1 and an oscillation signal S2 output from an oscillator 11, and outputs a PWM signal S3.

The PWM signal S3 is supplied via the latch section B to the MOSFETs 1 and 2 so as to control their states in such a manner that the MOSFET 1 and 2 are turned on and off alternately. The latch section B in the present embodiment is formed of a NOR latch circuit. Specifically, the latch section B consists of three NOR circuits 12, 13, and 14 and four inverter circuits 15, 16, 17, and 18. The latch section B alternately turns the MOSFETs 1 and 2 on and off on the basis of the PWM signal S3, and creates a blank period in which the both the MOSFETs 1 and 2 are off when their states change, by shifting the timings at which the MOSFETs 1 and 2 change to their on or off states. In the present embodiment, such a blank period in which the both the MOSFETs 1 and 2 are off is created when the MOSFETs 1 and 2 change to their on states. Notably, since the MOSFET 1 is a P-channel element, it enters an on state when a Pch output signal S8 output from the latch section B is L; and since the MOSFET 2 is a N-channel element, it enters an on state when an Nch output signal S9 output from the latch section B is H.

The operation mode switching section C detects and monitors voltage VLX at the connection point between the MOSFETs 1 and 2.

More specifically, the operation mode switching section C consists of a comparator 19 which compares a second reference voltage (predetermined voltage) Vref2 and the voltage VLX, a logic processing circuit 20, and a D flip flop circuit 21. The voltage VLX at the above-described connection point is compared with the second reference voltage Vref2 to thereby obtain a comparison signal S4, which represents which one of the voltage VLX and the second reference voltage Vref2 is greater. The comparison signal S4 is subjected to predetermined logic processing (which will be described later) in the logic circuit 20, to thereby obtain a D input signal S5 to be input to the D input terminal of the D flip flop circuit 21.

The D flip flop circuit 21 obtains a clock signal S6 to be used therein, from the output aide of the NOR circuit 12 of the latch section B. Specifically, the D flip flop circuit 21 obtains the clock signal S6 by use of an intermediate signal extracted from the latch section B, which is a circuit for forming a blank period immediately before each transition to an on state of the MOSFET 1, serving as the main switching means. Therefore, a state change (rising) of the clock signal S6 always occurs during the blank period. Accordingly, when the voltage VLX is greater than the second reference voltage Vref2 at the time the clock signal S6 rises, a Q output signal S7 output from the D flip flop circuit 21 assumes a high level so as to bring one input of the NOR circuit 14 into the high level. Therefore, the gate voltage of the N-channel MOSFET 2, which serves as sub switching means, assumes a low level without fail. Accordingly, the MOSFET 2 enters an off state, or maintains the off state, without fail. That is, the on and off states of the MOSFET 2 can be controlled in accordance with the value of the voltage VLX during the blank period immediately before the MOSFET 1 is switched to an on state. Therefore, when the second reference voltage Vref2 is set to a level higher than the zero potential (GND potential) but lower than the DC output voltage VOUT (e.g., about 0.2 to 0.6 V), a regular mode in which the MOSFETs 1 and 2 are alternately turned on and off in an ordinary manner and a non-regular mode in which the above control is not performed can be selected properly. In the non-regular mode, only the MOSFET 1 is turned on and off at a predetermined duty, and the MOSFET 2 is maintained off.

Figure 2:
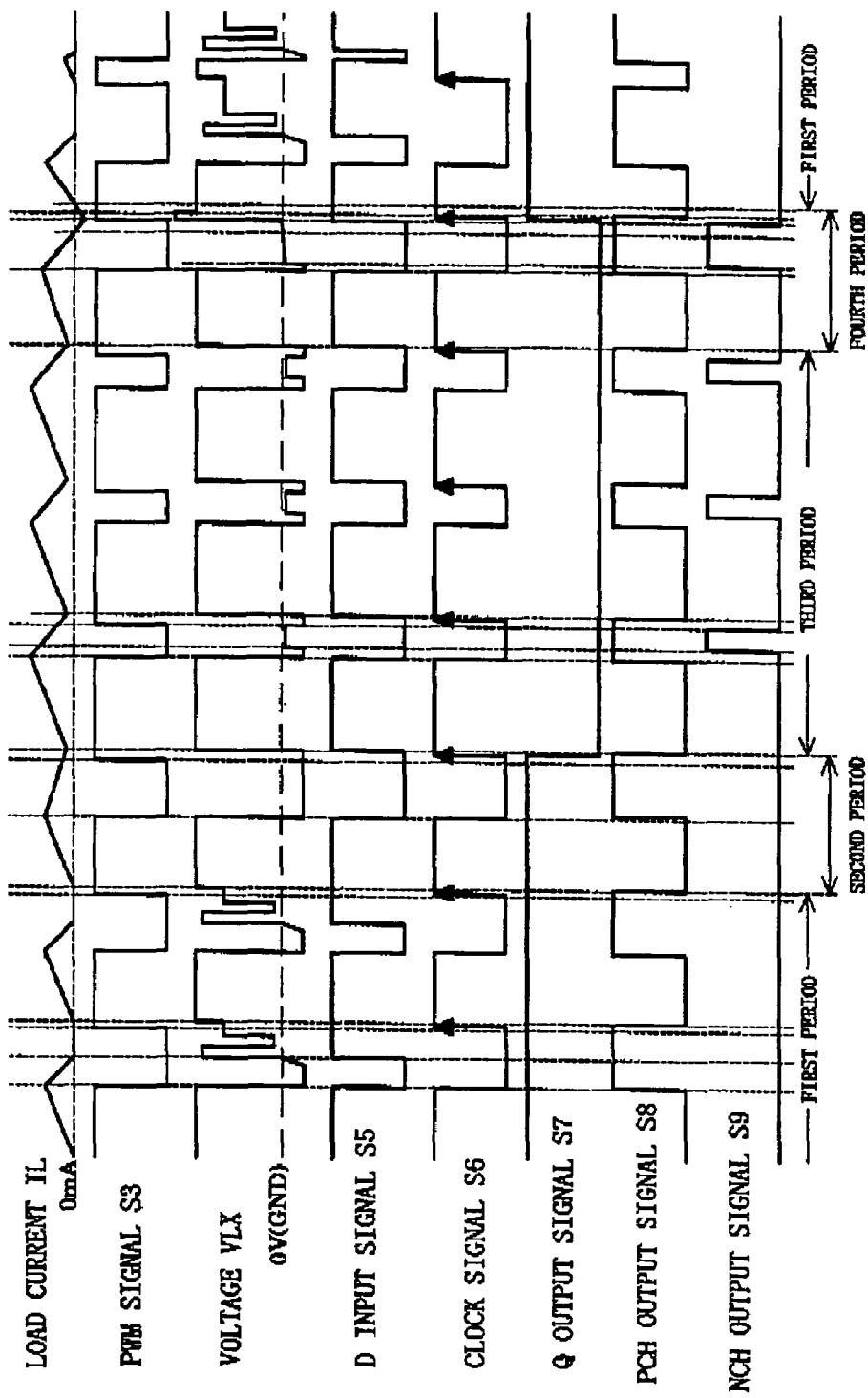
FIG. 2 is a waveform diagram (timing chart) showing variations in signals measured at respective portions of the control circuit shown in FIG. 1.
Figure 3:
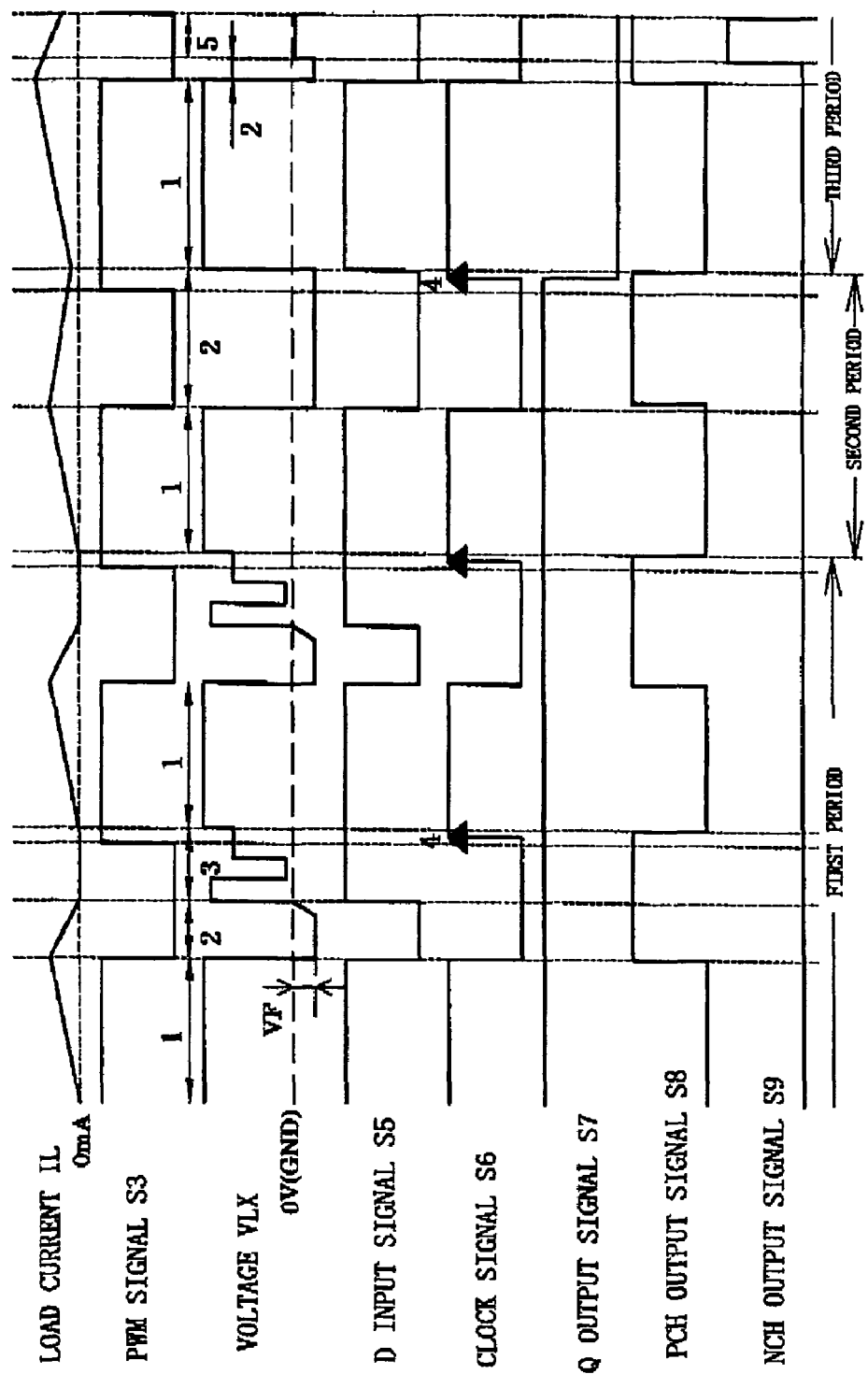
FIG. 3 is a detailed waveform diagram (timing chart) showing a first portion of the waveform diagram (timing chart) of FIG. 2.
Figure 4:
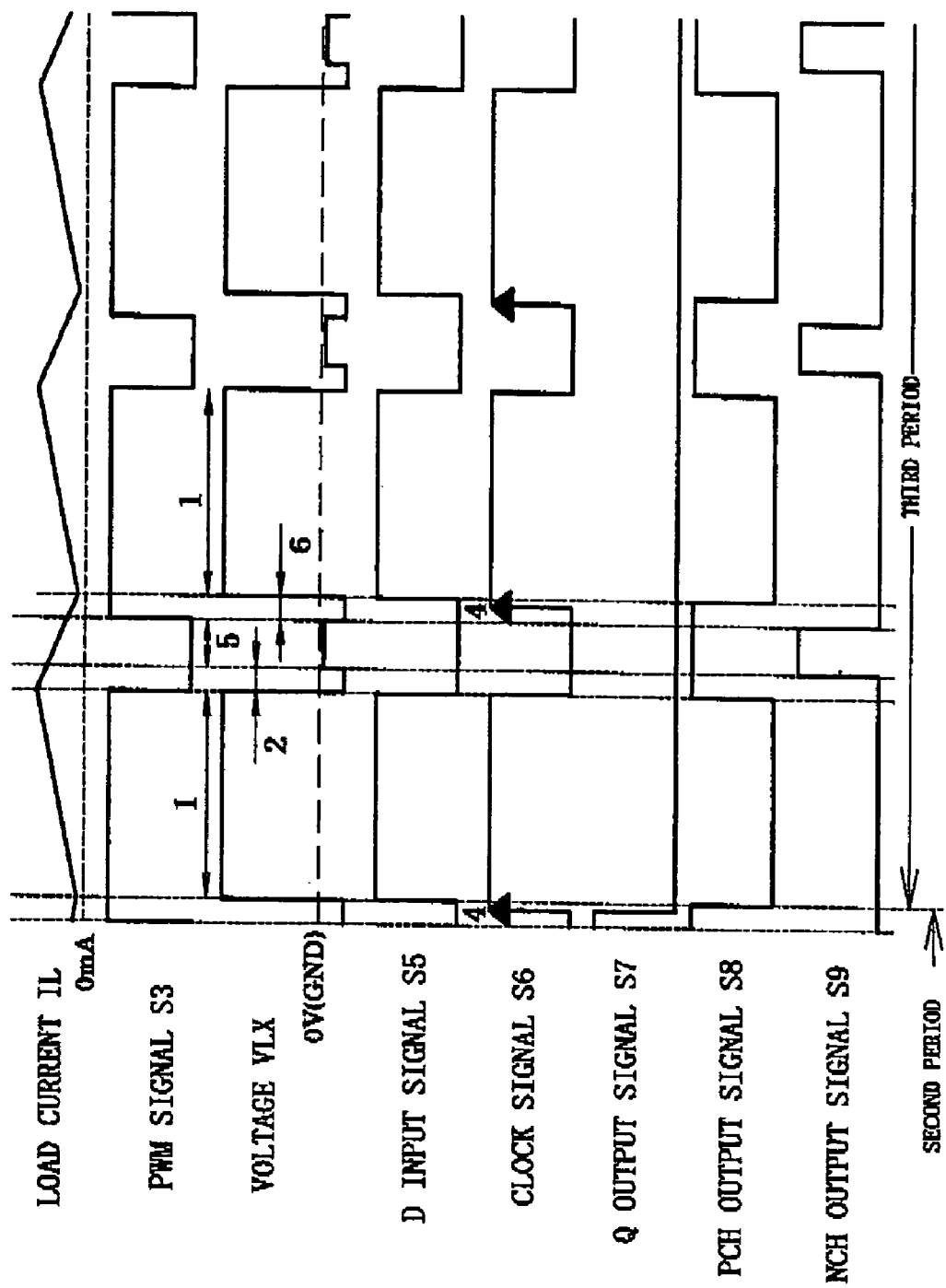
FIG. 4 is a detailed waveform diagram (timing chart) showing an intermediate portion of the waveform diagram (timing chart) of FIG. 2.
Figure 5:
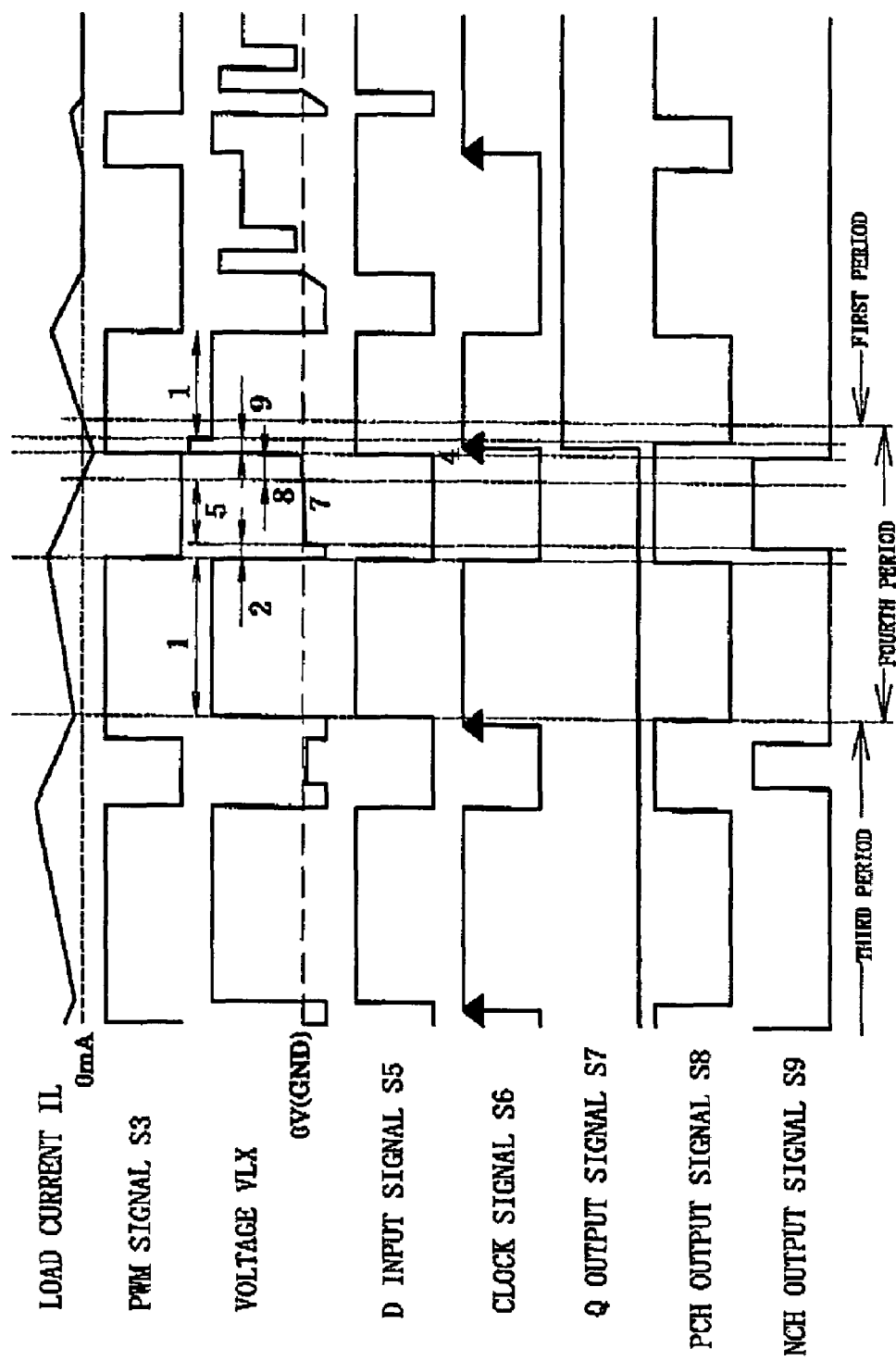
FIG. 5 is a detailed waveform diagram (timing chart) showing the last portion of the waveform diagram (timing chart) of FIG. 2.

FIGS. 2 to 5 are timing charts showing variations in signals measured at respective points in the control circuit shown in FIG. 1. Operation of the control circuit of the present embodiment will be described with reference to the timing charts. Notably, for convenience of illustration, a continuous timing chart shown in FIG. 2 is divided into three timing charts shown in FIGS. 3 to 5. Further, in order to clarify the description, the time scales of these timing charts do not necessarily correspond to the actual time scale. The timing charts contains exaggerated portions so as to facilitate general understanding of changes.

Control for the regular mode in which the MOSFETs 1 and 2 are alternately turned on and off is performed as follows. That is, a phenomenon that the voltage VLX changes is monitored by means of the comparator 19, and determination as to whether control for the regular mode is to be performed is made immediately before the P-channel MOSFET 1, which is the main switching element, is turned on, When the voltage VLX is lower than the reference voltage Vref2, the regular mode is determined to be performed. In such a case, the N-channel MOSFET 2, which is the sub switching element, is permitted to be turned on in the next single cycle. Meanwhile, when the voltage VLX is higher than the reference voltage Vref2, the non-regular mode is determined to be performed, and the MOSFET 2 is prohibited from being turned on in the next single cycle.

As described above, in the present embodiment, after performance of a predetermined mode determination, the MOSFET 2 is controlled in accordance with the results of the determination. That is, actual control of an control object (MOSFET 2) in accordance with the results of the mode determination is performed at a delayed timing with respect to the mode determination. Therefore, the comparator 19 is not necessarily required to operate at high speed, and can be formed of a small element which is inexpensive and consumes a small amount of electric power.

Next, the details of the timing charts will be described on a period-by-period basis.

-First Period-

During this period, the control mode is the non-regular mode. In the non-regular mode, the voltage VLX is substantially equal to the DC input voltage VIN during a period in which the MOSFET 1 is on (mode 1).

After the MOSFET 1 is turned off, the voltage VLX assumes a negative value corresponding to a voltage drop VF caused by the parasitic diode 2a of the MOSFET 2 (mode 2).

At the moment when load current IL decreases to zero, the voltage VLX resonates and then converges to the DC output voltage VOUT (mode 3). Changes in the voltage VLX in the mode 3 in the drawings schematically show the resonation. This resonation inevitably occurs stemming from the reactor 4, a parasitic capacitance in the vicinity thereof, etc.

In the first period, the above-described modes 1, 2, and 3 are repeated.

The D input signal S5, which is obtained from the comparison signal S4 (i.e., the output signal of the comparator 19) through processing at the logic processing circuit 20, assumes a high level during the period of mode 3 as a result of predetermined logical processing. This is because the logic processing circuit 20 latches the first rising edge of the voltage VLX in the cycle.

When such processing is not performed, the comparison signal S4, which is the output signal of the comparator 19, may oscillate, with respect to the reference voltage Vref2, upon resonation of the voltage VLX. In such a case, the comparator 19 performs unnecessary operations, and causes various problems such as wasteful consumption of electrical power.

Accordingly, the logic processing circuit 20 is not necessarily required for realization of the present embodiment; however, when the predetermined logical processing is performed by use of the logic processing circuit 20, the particular action described above and effects can be attained.

Further, the D flip flop circuit 21 latches the D input signal S5 at a time point corresponding to the rising edge of the clock signal S6 immediately before the next mode 1 period (during which the MOSFET 1 is on). As a result, the MOSFET 2 is prohibited from entering an on state in the next cycle. That is, the non-regular mode is maintained.

At this time, the clock signal S6 rises without fail during a blank period which is immediately before the MOSFET 1 is turned on and during which both the MOSFET 1 and the MOSFET 2 are off. This is because the clock signal S6 is an output signal of the NOR circuit 12, which is a logical element disposed in the middle of a path extending from the input side to the output side of the latch section B, which operates on the basis of the PWM signal S3 and forms the blank period by delaying the PWM signal S3.

-Second Period-

During this period as well, the control mode is the non-regular mode. However, this period serves as a period for transition to the regular mode. That is, the voltage VLX is substantially equal to the DC input voltage VIN during a period in which the MOSFET 1 is on (mode 1).

After the MOSFET 1 is turned off, the voltage VLX assumes a negative value corresponding to a voltage drop VF caused by the parasitic diode 2a of the MOSFET 2 (mode 2).

In the second period, control is performed in mode 1 and mode 2.

The D input signal S5, which is obtained from the comparison signal S4 (i.e., the output signal of the comparator 19) through processing at the logic processing circuit 20, assumes a low level during the mode 2 period.

The D flip flop circuit 21 latches the D input signal S5 at a time point corresponding to the rising edge of the clock signal S6 immediately before start of the next mode 1 period (during which the MOSFET 1 is on). As a result, the MOSFET 2 is permitted to enter an on state in the next cycle. That is, the regular mode is determined to be performed, and control for the regular mode is started.

-Third Period-

The voltage VLX is substantially equal to the DC input voltage VIN during a period in which the P-channel MOSFET 1, which serving as the main switching element, is on (mode 1).

During a period from when the MOSFET 1 is turned off until the N-channel MOSFET 2 is turned on, the voltage VLX assumes a negative value corresponding to a voltage drop VF caused by the parasitic diode 2a of the MOSFET 2 (mode 2).

The N-channel MOSFET 2 is turned on, whereby the voltage VLX assumes a negative value corresponding to a voltage drop represented by the product of IL (load current) and Rnsw (ON resistance of the MOSFET 2) (mode 5).

Subsequently, the N-channel MOSFET 2 is turned off. As a result, the voltage VLX assumes a negative value corresponding to a voltage drop VF caused by the parasitic diode 2a of the MOSFET 2 (mode 6).

In the third period, the above-described modes 1, 2, 5, and 6 are repeated.

The D input signal S5, which is obtained from the comparison signal S4 (i.e., the output signal of the comparator 19) through processing at the logic processing circuit 20, assumes a low level during the periods of predetermined modes 2, 5, and 6.

As a result, the D flip flop circuit 21 latches the D input signal S5 at a time point corresponding to the rising edge of the clock signal S6 in the mode 6 period immediately before start of the next mode 1 period (during which the MOSFET 1 is on) (mode 4), to thereby permit the N-channel MOSFET 2 to enter an on state in the next cycle. That is, the regular mode is determined to be performed.

-Fourth Period-

The voltage VLX is substantially equal to the DC input voltage VIN during a period in which the MOSFET 1 is on (mode 1).

During a period from when the MOSFET 1 is turned off until the N-channel MOSFET 2 is turned on, the voltage VLX assumes a negative value corresponding to a voltage drop VF caused by the parasitic diode 2a of the MOSFET 2 (mode 2).

The N-channel MOSFET 2 is turned on, whereby the voltage VLX assumes a negative value corresponding to a voltage drop represented by the product of IL (load current) and Rnsw (ON resistance of the MOSFET 2) (mode 5), Subsequently, the load current IL decreased to zero (mode 7).

Subsequently, the load current IL starts to flow from the output terminal 5 side toward the reactor 4; i.e., a negative load current IL flows (mode 8).

When the MOSFET 2 is turned off, the voltage VLX assumes a positive value corresponding to the sum of the output voltage of the DC power source 3 and a voltage drop VF caused by the parasitic diode 1a of the MOSFET 1 (mode 9).

In the conventional technique, the zero point of the load current IL is detected by use of a high-accuracy comparator so as to prevent reverse flow. In contrast, in the present embodiment, a similar phenomenon is detected, as an anomalous voltage in the mode 9 period, through monitoring of the voltage VLX.

In the fourth period, control is performed in modes 1, 2, 5, 7, 8, and 9.

The D input signal S5, which is obtained from the comparison signal S4 (i.e., the output signal of the comparator 19) through processing at the logic processing circuit 20, assumes a high level during the mode B period.

As a result, as shown in mode 4, the D flip flop circuit 21 latches the D input signal S5 at a time point corresponding to the rising edge of the clock signal S6 in the mode 9 period immediately before start of the next mode 1 period (during which the MOSFET 1 is on), to thereby prohibit the MOSFET 2 from entering an on state in the next cycle. That is, the non-regular mode is determined to be performed.

Figure 6:
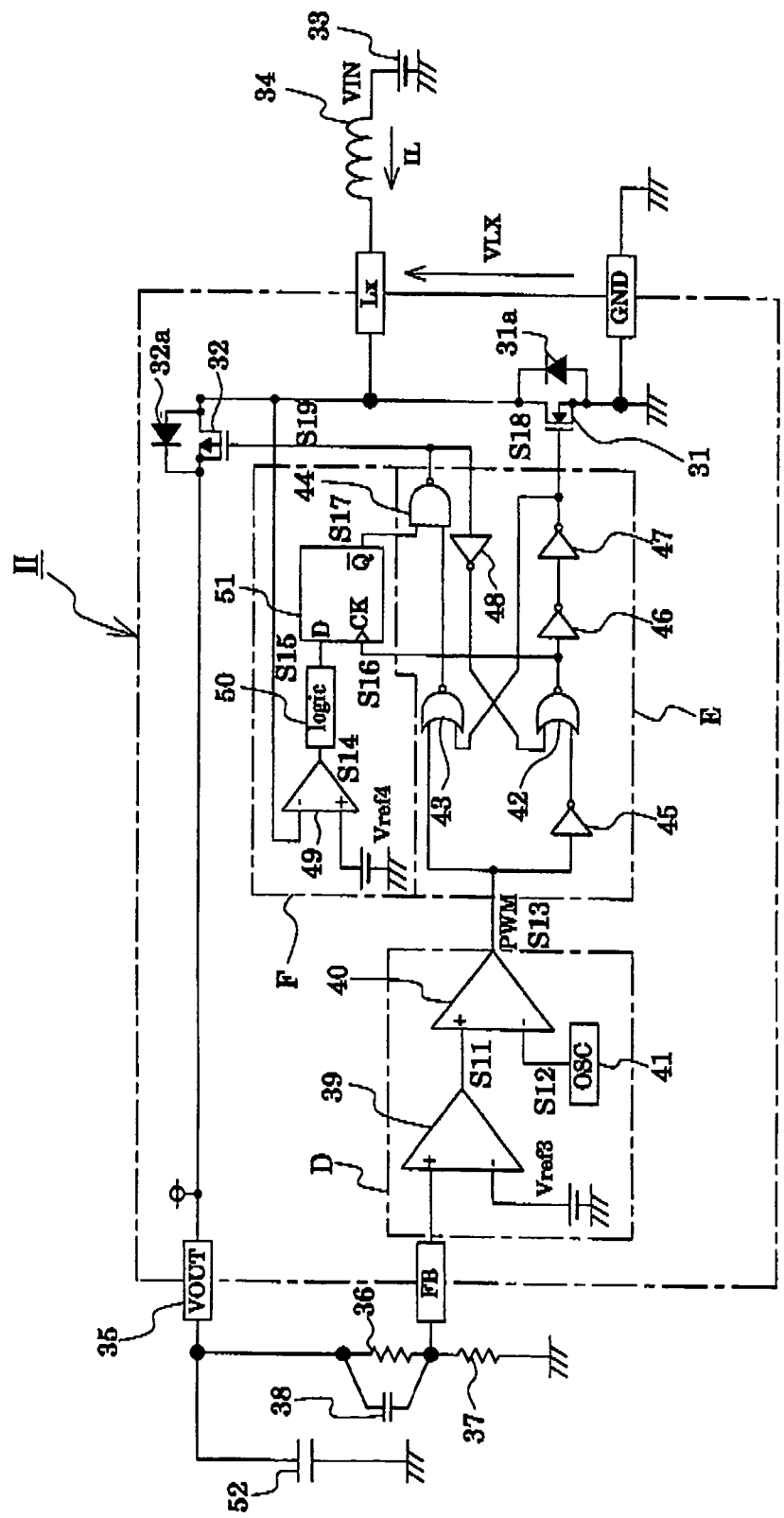
FIG. 6 is a circuit diagram showing a control circuit according to a second embodiment of the present invention, along with a DC/DC converter to which the control circuit is applied.

Second Embodiment:

Before description of a control circuit according to the present embodiment, a main circuit of a DC/DC converter to which the control circuit is applied will be described. FIG. 6 is a circuit diagram showing a control circuit for a DC/DC converter according to a second embodiment of the present invention, along with the main circuit thereof.

The DC/DC converter according to the present embodiment is a step-up converter. In the DC/DC converter, a reactor 34 is connected in series to a MOSFET 32, which serves as sub switching means and to which a diode 32a is connected in parallel. A DC power source 33 is connected is series to the reactor 34 and the MOSFET 32. Meanwhile, a MOSFET 31, which serves as main switching means and to which a diode 31a is connected in parallel and in the reverse direction, is connected to the point of connection between the reactor 34 and the MOSFET 32.

In such a DC/DC converter, the MOSFETs 31 and 32 are controlled such that they are alternately turned on and off, and the OFF time of the MOSFET 31 is controlled in order to step up the DC output voltage of the DC power source 33 (DC input voltage VIN of the DC/DC converter) to thereby output a predetermined DC output voltage VOUT from an output terminal 35. That is, the DC output voltage VOUT is defined by the OFF time of the MOSFET 31. This is because a voltage generated on the basis of electrical energy accumulated in the reactor 34 in periods during which the MOSFET 31 is on is superposed on the DC input voltage VIN to generate the DC output voltage VOUT in periods during which the MOSFET 31 is off. In FIG. 6, reference numeral 52 denotes a capacitor for smoothing the DC output voltage VOUT.

The control circuit according to the present embodiment for turning on and off the MOSFETs 31 and 32 includes a PWM signal generating section D, a latch section E, and an operation mode switching section F, which are integrated in the form of an IC chip II. That is, except the differences stemming from the fact that the DC/DC convert to be controlled is a step-up converter, the control circuit of the present embodiment basically has the same configuration and the same functions as those of the circuit shown in FIG. 1.

In the PWM signal generation section D, the DC output voltage VOUT which is divided by use of resistors 36 and 37 and a capacitor 38 is applied to an error amplifier 39. A third reference voltage Vref3 is also applied to the error amplifier 39, whereby an error signal S11 is obtained. A comparator 40 compares the error signal S11 and an oscillation signal S12 output from an oscillator 41, and outputs a PWM signal S13.

The PWM signal S13 is supplied via the latch section E to the MOSFETs 31 and 32 so as to control their states in such a manner that the MOSFET 31 and 32 are turned on and off alternately. The latch section E in the present embodiment is formed of a NOR latch circuit. Specifically, the latch section E consists of two NOR circuits 42 and 43, a NAND circuit 44, and four inverter circuits 45., 46, 47, and 48. The latch section E alternately turns the MOSFETs 31 and 32 on and off on the basis of the PWM signal S13, and creates a blank period in which the both the MOSFETs 31 and 32 are off when their states change to an on state, by shifting the timings at which the MOSFETs 31 and 32 change to their on or off states. In the present embodiment, such a blank period in which the both the MOSFETs 31 and 32 are off is created when the MOSFETs 31 and 32 change to their on states. Notably, since the MOSFET 31 is an N-channel element, it enters an on state when an Nch output signal S18 output from the latch section E assumes a high level; and since the MOSFET 32 is a P-channel element, it enters an on state when a Pch output signal S19 output from the latch section E assumes a low level.

The operation mode switching section F detects and monitors voltage VLX at the connection point between the MOSFETs 31 and 32.

More specifically, the operation mode switching section F consists of a comparator 49 which compares a fourth reference voltage (predetermined voltage) Vref4 and the voltage VLX, a logic processing circuit 50, and a D flip flop circuit 51. The voltage VLX at the above-described connection point is compared with the fourth reference voltage Vref4 to thereby obtain a comparison signal S14, which represents which one of the voltage VLX and the fourth reference voltage Vref4 is grater. The comparison signal S14 is subjected to predetermined logic processing (which will be described later) in the logic processing circuit 50, to thereby obtain a D input signal S15 to be input to the D input terminal of the D flip flop circuit 51.

The D flip flop circuit 51 obtains a clock signal S16 to be used therein, from the output side of the NOR circuit 42 of the latch section E. Specifically, the D flip flop circuit 51 obtains the clock signal S16 by use of an intermediate signal extracted from the latch section E, which is a circuit for forming a blank period immediately before each transition to an on state of the MOSFET 31, serving as the main switching means. Therefore, a state change (rising) of the clock signal S16 always occurs in the blank period. Accordingly, when the voltage VLX is lower than the fourth reference voltage Vref4 at the time of rising of the clock signal S16, a $\overline{Q}$ output signal (an inverted signal of the Q output signal) S17 output from the D flip flop circuit 51 assumes a low level so as to bring one input of the NAND circuit 44 into the same level. Therefore, the gate voltage of the P-channel MOSFET 32, which serves as the sub switching means, becomes A high level without fail. Accordingly, the MOSFET 32 enters an off state, or maintains the off state, without fail. That is, the on and off states of the sub switching means can be controlled in accordance with the value of the voltage VLX during the blank period immediately before the MOSFET 31 is switched to an on state. Therefore, when the fourth reference voltage Vref4 is set to a level higher than the DC input voltage VIN but lower than the DC output voltage VOUT, a regular mode in which the MOSFETs 31 and 32 are alternately turned on and off in an ordinary manner and a non-regular mode in which the above control is not performed can be selected properly. In the non-regular mode, only the MOSFET 31 is turned on and off at a predetermined duty, and the MOSFET 32 is maintained off.

Figure 7:
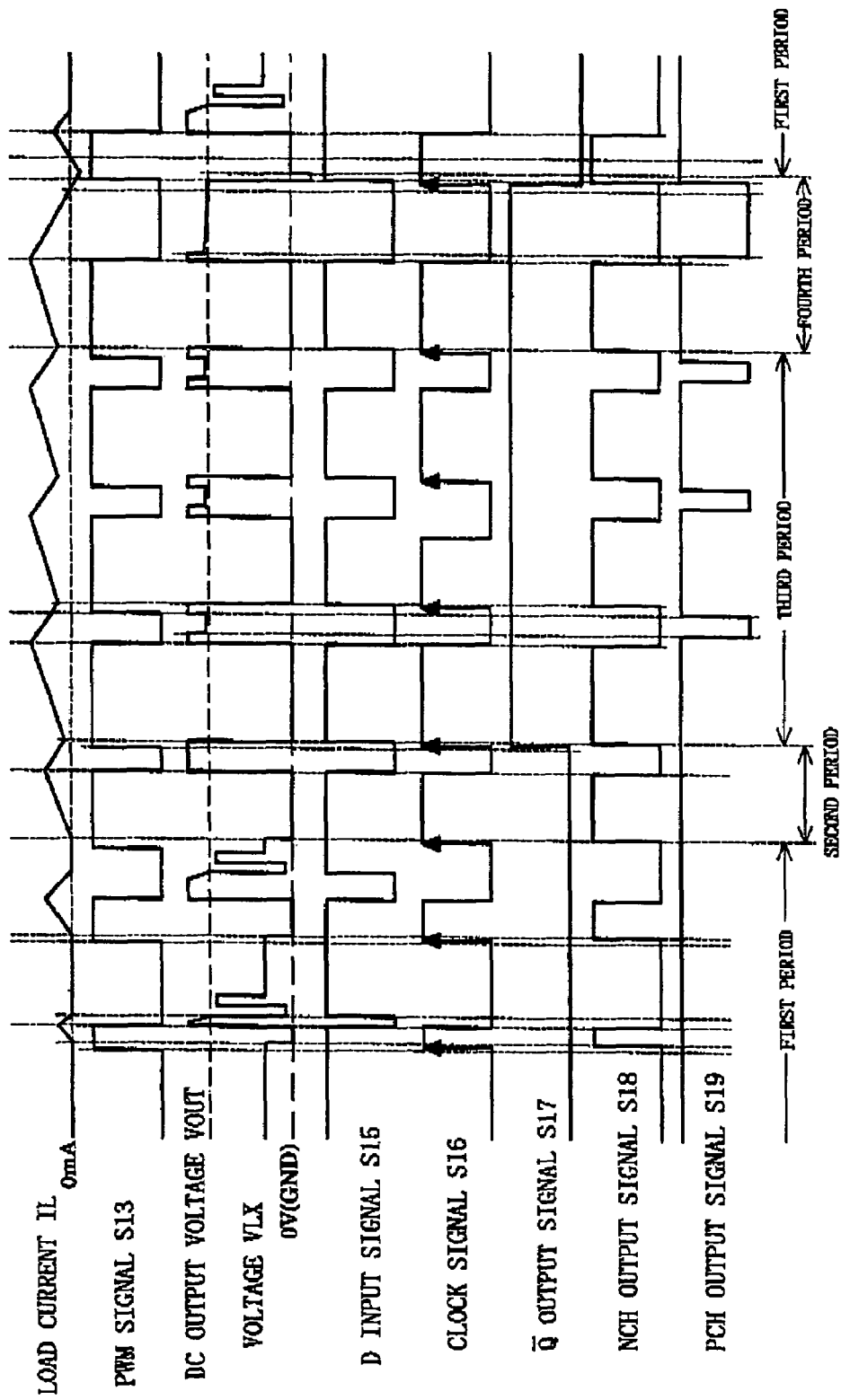
FIG. 7 is a waveform diagram (timing chart) showing variations in signals measured at respective portions of the control circuit shown in FIG. 6.
Figure 8:
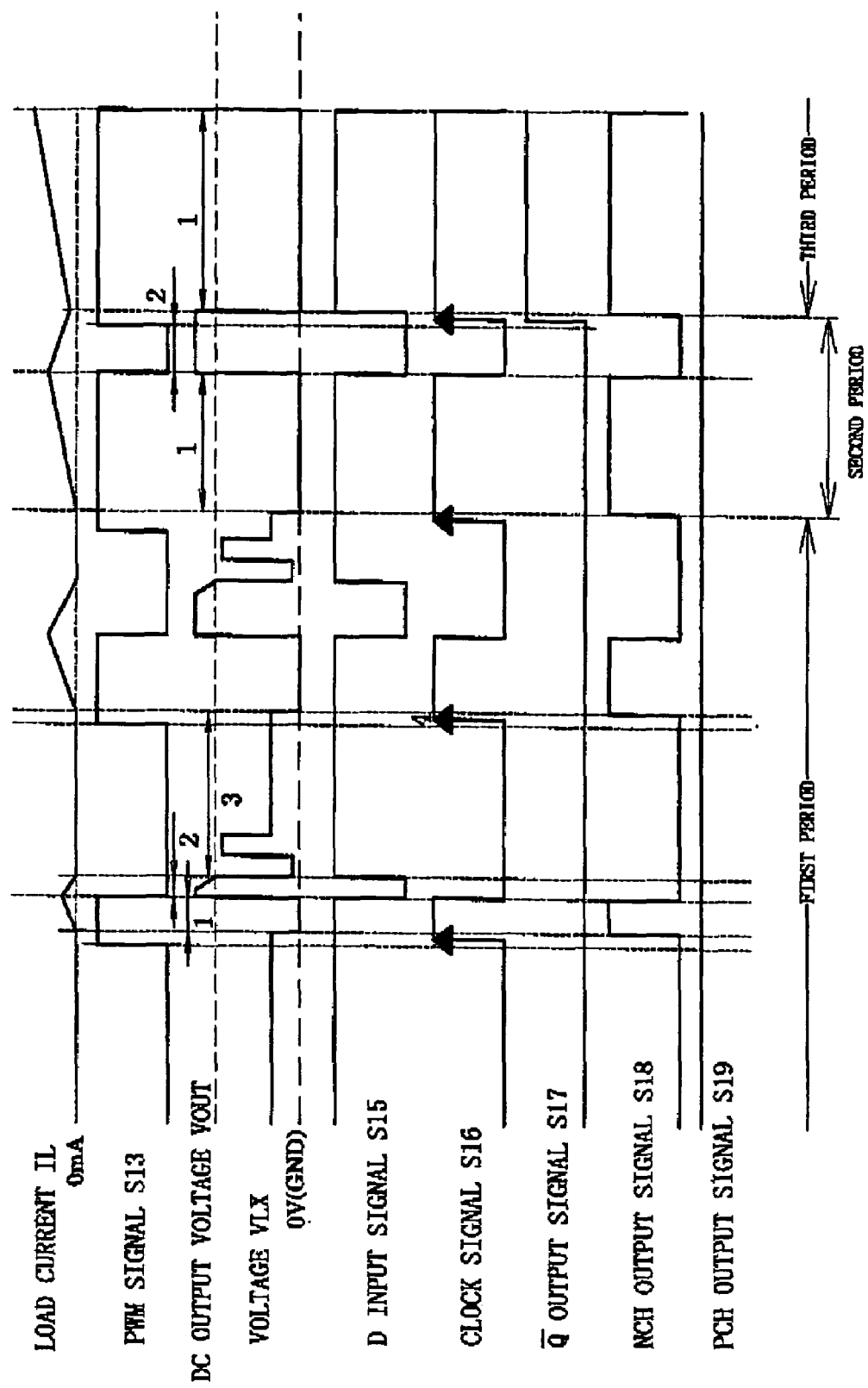
FIG. 8 is a detailed waveform diagram (timing chart) showing a first portion of the waveform diagram (timing chart) of FIG. 7.
Figure 9:
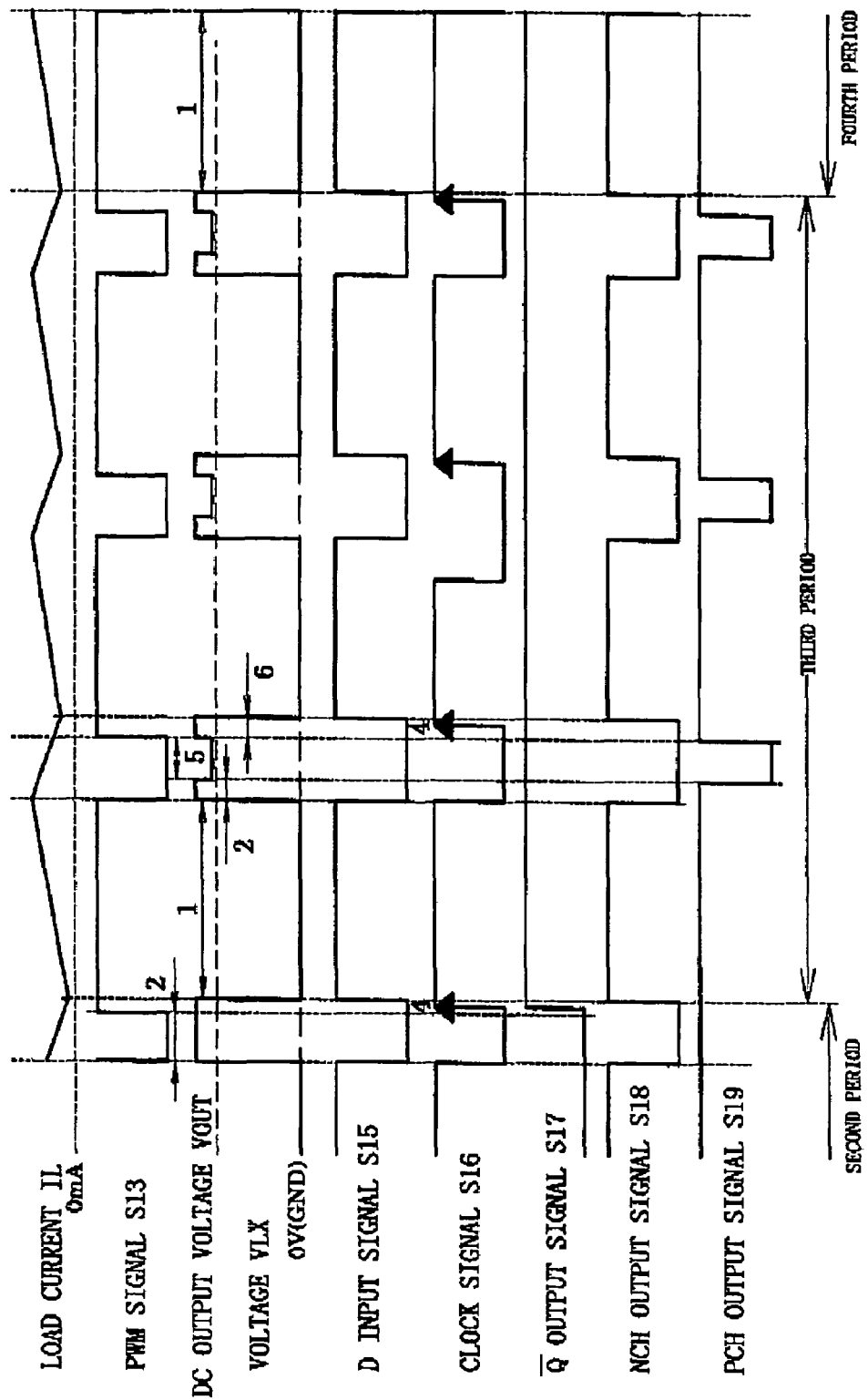
FIG. 9 is a detailed waveform diagram (timing chart) showing an intermediate portion of the waveform diagram (timing chart) of FIG. 7.
Figure 10:
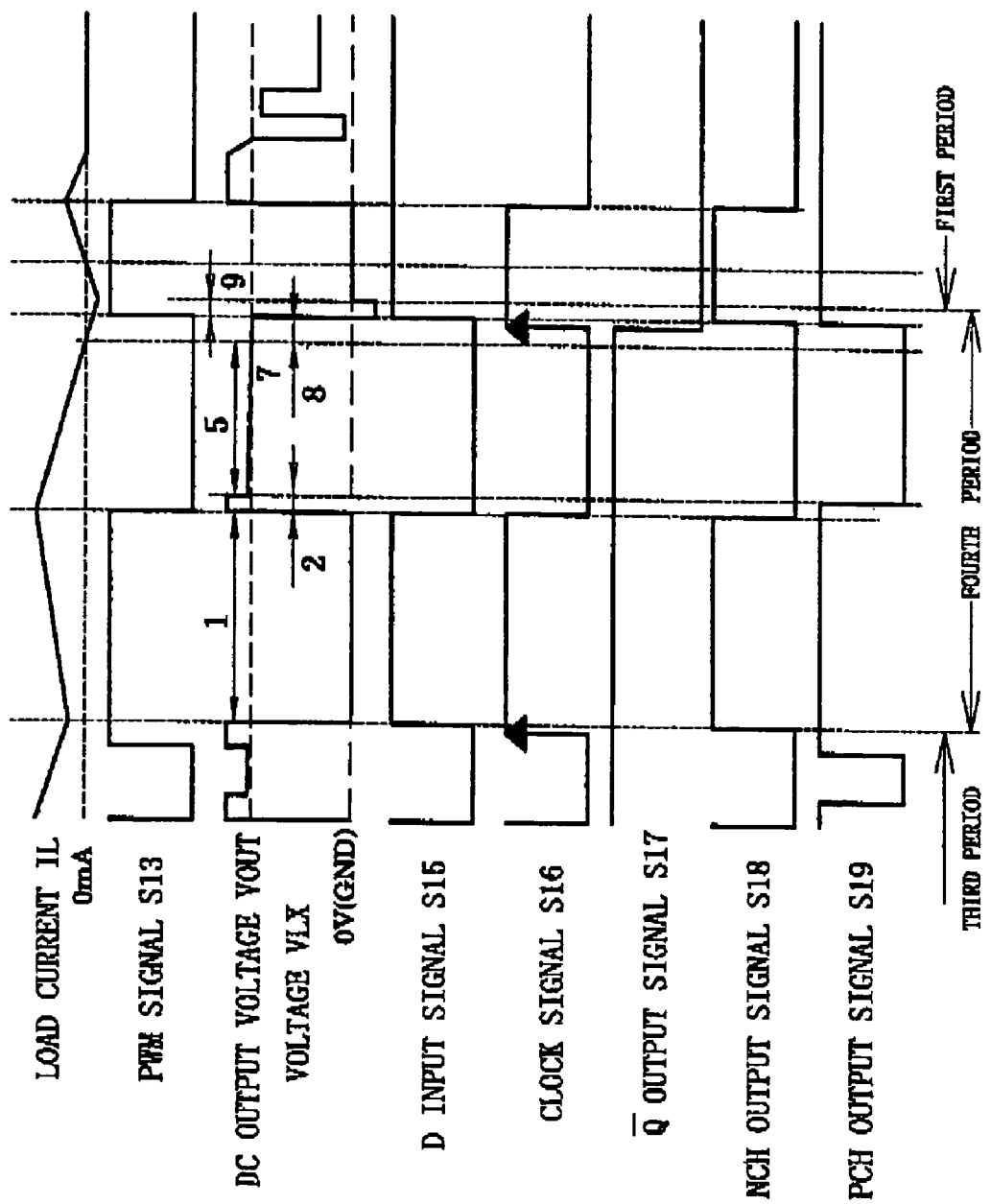
FIG. 10 is a detailed waveform diagram (timing chart) showing the last portion of the waveform diagram (timing chart) of FIG. 7.

FIGS. 7 to 10 are timing charts showing signals measured at respective points in the control circuit shown in FIG. 1. Operation of the control circuit of the present embodiment will be described with reference to the timing charts. Notably, for convenience of illustration, a continuous timing chart shown in FIG. 7 is divided into three timing charts shown in FIGS. 8 to 10. Further, in order to clarify the description, the time scales of these timing charts do not necessarily correspond to the actual time scale. The timing charts contains exaggerated portions so as to facilitate general understanding of changes.

Control for the regular mode in which the MOSFETs 31 and 32 are alternately turned on and off is performed as follows. That is, a phenomenon that the voltage VLX changes is monitored by means of the comparator 49, and determination as to whether control for the regular mode is to be performed is made immediately before the N-channel MOSFET 31, which is the main switching element, is turned on. When the voltage VLX is higher than the fourth reference voltage Vref4, the regular mode is determined to be performed. In such a case, the P-channel MOSFET 32, which is the sub switching element, is permitted to be turned on in the next single cycle. Meanwhile, when the voltage VLX is lower than the fourth reference voltage Vref4, the non-regular mode is determined to be performed, and the MOSFET 32 is prohibited from being turned on in the next single cycle.

As described above, in the present embodiment, after performance of a predetermined mode determination, the MOSFET 32 is controlled in accordance with the results of the determination. That is, actual control of an control object (MOSFET 32) in accordance with the results of the mode determination is performed at a delayed timing with respect to the mode determination. Therefore, the comparator 49 is not necessarily required to operate at high speed, and can be formed of a small element which is inexpensive and consume a small amount of electric power.

Next, the details of the timing charts will be described on a period-by-period basis.

-First Period-

During this period, the control mode is the non-regular mode. In the non-regular mode, the voltage VLX is substantially equal to GND during a period in which the MOSFET 31 is on (mode 1).

After the MOSFET 31 is turned off, the voltage VLX becomes higher than the DC output voltage VOUT by an amount corresponding to a voltage drop VF caused by the parasitic diode 32a of the P-channel MOSFET 32 (mode 2).

At the moment when load current IL decreases to zero, the voltage VLX resonates and then converges to the DC output voltage VIN of the DC power source 33 (mode 3). Changes in the voltage VLX in the mode 3 in the drawings schematically show the resonation. This resonation inevitably occurs stemming from the reactor 34, a parasitic capacitance in the vicinity thereof, etc.

In the first period, the above-described modes 1, 2, and 3 are repeated.

The D input signal S15, which is obtained from the comparison signal $14 (i.e., the output signal of the comparator 49) through processing at the logic processing circuit 50, assumes a high level during the period of mode 3 as a result of predetermined logical processing. This is because the logic processing circuit 50 latches the first rising edge of the voltage VLX in the cycle.

When such processing is not performed, the comparison signal S14, which is the output signal of the comparator 49, may oscillate, with respect to the fourth reference voltage Vref4, upon resonation of the voltage VLX. In such a case, the comparator 49 performs unnecessary operations, and causes various problems such as wasteful consumption of electrical power.

Accordingly, the logic processing circuit 50 is not necessarily required for realization of the present embodiment; however, when the predetermined logical processing is performed by use of the logic processing circuit 50, the above-described peculiar action and effects can be attained.

Further, the D flip flop circuit 51 latches the D input signal S15 at a time point corresponding to the rising edge of the clock signal S16 immediately before start of the next mode 1 period (during which the MOSFET 31 is on). As a result, the MOSFET 32 is prohibited from entering an on state in the next cycle. That is, the non-regular mode is maintained.

At this time, the clock signal S16 rises without fail during a blank period which is immediately before the MOSFET 31 is turned on and during which both the MOSFET 31 and the MOSFET 32 are off. This is because the clock signal S16 is an output signal of the NOR circuit 42, which is a logical element disposed in the middle of a path extending from the input side to the output side of the latch section E, which operates on the basis of the PWM signal S13 and forms the blank period by delaying the PWM signal S13.

-Second Period-

During this period as well, the control mode is the non-regular mode. However, this period serves as a period for transition to the regular mode, That is, the voltage VLX is substantially equal to GND during a period in which the MOSFET 31 is on (mode 1).

After the MOSFET 31 is turned off, the voltage VLX becomes higher than the DC output voltage VOUT by an amount corresponding to the voltage drop VF caused by the parasitic diode 32a of the MOSFET 32 (mode 2).

In the second period, control is performed in mode 1 and mode 2.

The D input signal 15, which is obtained from the comparison signal S14 (i.e., the output signal of the comparator 49) through processing at the logic processing circuit 50, assumes a low level during the mode 2 period.

The D flip flop circuit 51 latches the D input signal S15 at a time point corresponding to the rising edge of the clock signal S16 immediately before start of the next mode 1 period (during which the MOSFET 31 is on). As a result, the MOSFET 32 is permitted to enter an on state in the next cycle. That is, the regular mode is determined to be performed, and control for the regular mode is started.

-Third Period-

The voltage VLX is substantially equal to GND during a period in which the MOSFET 31 is on (mode 1).

After that, the MOSFET 31 is turned off. As a result, the voltage VLX becomes higher than the DC output voltage VOUT by an amount corresponding to the voltage drop VF caused by the parasitic diode 32a of the MOSFET 32 (mode 2).

Subsequently, the MOSFET 32 is turned on, whereby the voltage VLX becomes higher than the DC output voltage VOUT by an amount corresponding to the product of IL and Rnsw (ON resistance of the MOSFET 32) (mode 5).

After that, the MOSFET 32 is turned off. As a result, the voltage VLX becomes higher than the DC output voltage VOUT by an amount corresponding to the voltage drop VE caused by the parasitic diode 32a of the MOSFET 32 (mode 6).

In the third period, the above-described modes 1, 2, 5, and 6 are repeated.

The D input signal S15 assumes a low level during the periods of modes 2, 5, and 6.

As a result, the D flip flop circuit 51 latches the D input signal S15 at a time point corresponding to the rising edge (mode 4) of the clock signal 516 in the mode 6 period immediately before start of the next mode 1 period (during which the MOSFET 31 is on), to thereby permit the MOSFET 32 to enter an on state in the next cycle. That is, the regular mode is determined to be performed.

-Fourth Period-

The voltage VLX is substantially equal to GND during a period in which the MOSFET 31 is on (mode 1).

When the MOSFET 31 is turned off, the voltage VLX becomes higher than the DC output voltage VOUT by an amount corresponding to a voltage drop VF caused by the parasitic diode 32a of the MOSFET 32 (mode 2).

The MOSFET 32 is turned on, whereby the voltage VLX becomes higher than the DC output voltage VOUT by an amount corresponding to the product of IL and Rnsw (ON resistance of the MOSFET 32) (mode 5) Subsequently, the load current IL decreased to zero (mode 7).

Subsequently, the load current IL starts to flow from the output terminal 35 side toward the reactor 34 via the MOSFET 32; i.e., a negative load current IL flows (mode 8).

When the MOSFET 32 is turned off, the voltage VLX assumes a negative value corresponding to the voltage drop VF caused by the parasitic diode 32a of the MOSFET 32 (mode 9).

In the conventional technique, the zero point of the load current IL is detected by use of a high-accuracy comparator so as to prevent reverse flow. In contrast, in the present embodiment, a similar phenomenon is detected, as an anomalous voltage in the mode 9 period, through monitoring of the voltage VLX.

In the fourth period, control is performed in modes 1, 2, 5, 7, 8, and 9.

At this time, the D input signal S15 assumes a high level during the mode 8 period.

As a result, the D flip flop circuit 51 latches the D input signal S15 at a time point corresponding to the rising edge (mode 4) of the clock signal S16 in the mode 9 period immediately before start of the next mode 1 period (during which the MOSFET 31 is on), to thereby prohibit the MOSFET 32 from entering an on state in the next cycle. That is, the non-regular mode is determined to be performed.

In the above-described two embodiments, MOSFETs are used as switching means. However, switching means are not limited thereto. Theoretically, any special limitation is imposed on the switching means so long as selected switching means can properly pass and block output current from a DC power source on the basis of a PWM signal or a PFM signal.

Further, the configuration of the latch section is not limited to those of the latch sections B and E in the above-described embodiments. Any special limitation is imposed on the latch section so long as the latch section is configured such that it can form a blank period in which both the main switching means and the sub switching means are off, and can form a clock signal whose state changes without fall during the blank period.

What is claimed is:

1. A control circuit for a DC/DC converter comprising main switching means, sub switching means, and a reactor and adapted to convert a DC input voltage to a predetermined DC output voltage, the control circuit comprising:

clock signal generation means for generating a clock signal in a blank period in which both the main switching means and the sub switching means are off;

a comparator for comparing a predetermined reference voltage higher than the ground potential but lower than the DC output voltage of the DC/DC converter, and a voltage at a connection point at which the main switching means and the sub switching means are connected together, and for outputting a comparison signal indicating a relation of magnitude between the reference voltage and the voltage at the connection point; and operation mode switching means operating such that when the voltage at the connection point during the blank period which is latched in response to the clock signal is not higher than the reference voltage, control is determined to be performed in a regular mode, whereby the main switching means and the sub switching means are alternately turned on and off; and when the voltage at the connection point during the blank period is higher than the reference voltage, the control is determined to be performed in a non-regular mode, whereby only the main switching means is turned on and off at a predetermined duty, with the sub switching means being maintained off.

2. A control circuit for a DC/DC converter comprising main switching means, sub switching means, and a reactor and adapted to convert a DC input voltage to a predetermined DC output voltage, the control circuit comprising:

clock signal generation means for generating a clock signal in a blank period in which both the main switching means and the sub switching means are off;

a comparator for comparing a predetermined reference voltage higher than the DC input voltage of the DC/DC converter but lower than the DC output voltage of the DC/DC converter, and a voltage at a connection point at which the main switching means and the sub switching means are connected together, and for outputting a comparison signal indicating a relation of magnitude between the reference voltage and the voltage at the connection point; and operation mode switching means operating such that when the voltage at the connection point during the blank period which is latched in response to the clock signal is not lower than the reference voltage, control is determined to be performed in a regular mode, whereby the main switching means and the sub switching means are alternately turned on and off; and when the voltage at the connection point during the blank period is lower than the reference voltage, the control is determined to be performed in a non-regular mode, whereby only the main switching means is turned on and off at a predetermined duty, with the sub switching means being maintained off.

3. A control circuit for a DC/DC converter according to claim 1 or 2, wherein the clock signal is an output signal of an intermediate one of a plurality of logical elements connected in cascade to form latch means for generating the blank period.

4. A control circuit for a DC/DC converter according to claim 1 or 2, wherein the operation mode switching means controls the sub switching means at a time point delayed from the clock signal.

5. A control circuit for a DC/DC converter according to claim 1 or 2, further comprising a logic processing circuit, which operates when the comparison signal varies stemming from a variation in the voltage at the connection point caused by resonance of the voltage, for latching a first state change of the comparison signal and for maintaining the state during the period of a predetermined cycle.

6. A control circuit for a DC/DC converter according to claim 2, further comprising a logic processing circuit, which operates when the comparison signal varies stemming from a variation in the voltage at the connection point caused by resonance of the voltage, for latching a first state change of the comparison signal and for maintaining the state during the period of a predetermined cycle.

* * * * *